Dec. 22, 1931.  A. J. SMITH  1,838,066
METHOD OF ATTACHING SNAP FASTENER MEMBERS TO PANELS
Filed April 13, 1931
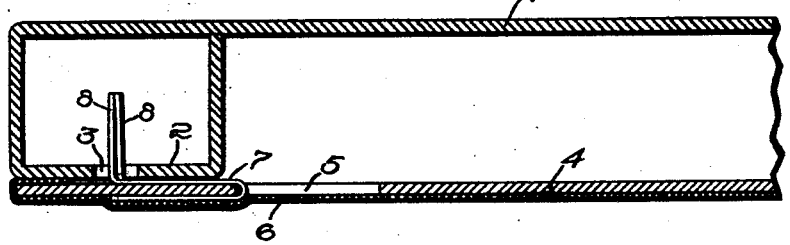
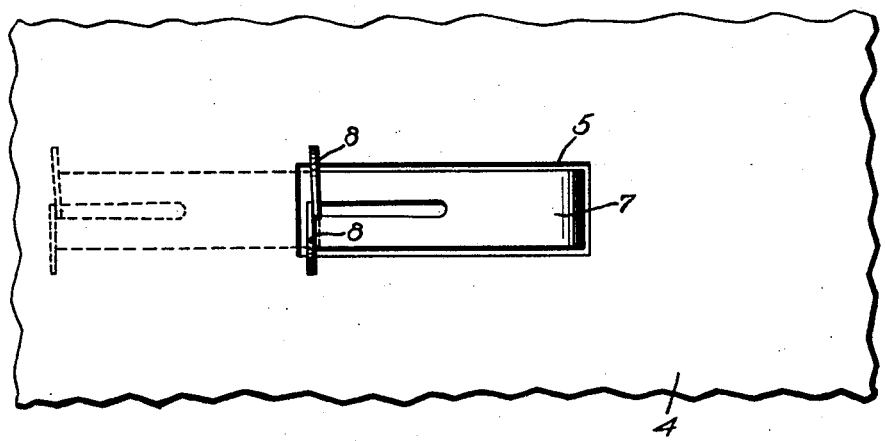
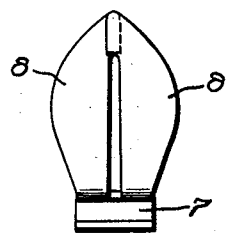
Inventor:
Alfred J. Smith
by Emery, Booth, Varney + Townsend
Attys

UNITED STATES PATENT OFFICE

ALFRED J. SMITH, OF DETROIT, MICHIGAN, ASSIGNOR TO UNITED-CARR FASTENER CORPORATION, OF CAMBRIDGE, MASSACHUSETTS, A CORPORATION OF MASSACHUSETTS

METHOD OF ATTACHING SNAP FASTENER MEMBERS TO PANELS

Application filed April 13, 1931. Serial No. 529,702.

My invention aims to provide improvements in the method of attaching snap fastener members to upholstery panels and the like.

In the drawing which illustrates a preferred embodiment of my invention:—

Figure 1 is a plan section of a portion of a motor vehicle door showing the use of my invention;

Fig. 2 is an enlarged view of a portion of an upholstered panel as viewed from the inner face thereof and showing the method of attachment of the fastener members; and Fig. 3 is an end elevation of the snap fastener device adapted to be attached to the panel.

Heretofore, fasteners having U-shaped bases or attaching portions have been attached by tipping the fastener in such a manner that one of the arms of the U-shaped portion could be inserted through an opening in the cardboard or like panel. Then the fastener was forced into place with the supporting structure located between the arms. While this method is all right in some installations it is not so practical in others, such for instance as when the panel is relatively thick, and the fastener cannot be sprung into position or as when the material is so thin that it tears when springing the fasteners into place.

My improved method of securing the fasteners to the upholstered panels is simple and no more expensive than other methods and is adapted for use with any type of installation where a fastener having a U-shaped base is desired.

Referring to the particular installation illustrated by the drawing, I have shown a part of a door structure 1 (Fig. 1) having a metal frame portion 2 of usual construction in which are located the usual series of stud-receiving apertures 3. The panel structure to be secured to the inner face of the door comprises a cardboard panel part 4 in which is provided a series of oblong shaped apertures 5 spaced inwardly from the periphery, one of which is shown in Fig. 2. The outer face of the panel part 4 is covered by a suitable covering 6 of cloth, leather, or the like, which is folded over the edge (Fig. 1) and secured in any suitable manner at the inner face.

The snap fastener members are formed from sheet metal and each is made from a single piece having a U-shaped base 7 and a pair of flat fingers 8—8 extending from one of the arms of the base 7 to provide stud means.

A preferred method of assembling the panel installation complete for attachment to the door is to form the apertures 5 in the panel part 4 of such an area that they are at least as large as the area of an arm of the base, which arm is to pass through an aperture 5. It has been found that the best practice is to apply the covering 6 to the panel part 4 before the fasteners are applied. Therefore, if we assume that the covering has been applied the fasteners may be easily and quickly attached by simply entering one arm of the U-shaped base 7 axially into an aperture 4 until it rests against the covering 6. Then the fastener is moved bodily toward the edge of the panel in a lateral direction so that the arms of the U-shaped base engage opposite sides of the backing part 4, as shown in Figure 1. This method is clearly indicated by Figure 2 wherein the stud member is shown in full lines as it appears when being entered into an aperture and dotted lines when it is moved into its normal assembled position. It is, of course, understood that the fasteners are shiftable to some extent laterally so that they may permit alignment of the fingers 8—8 with the apertures 3 when applying the panel.

While I have illustrated and described a preferred embodiment of my invention, I do not wish to be limited thereby, because the scope of my invention is best defined by the following claims.

Claims:

1. In an installation of the class described, the method of securing a snap fastener members having a U-shaped attaching portion to a panel having one side covered by upholstery which comprises forming an aperture in said panel of a size at least as large in area as the area of one of the arms of the U-shaped attaching portion and securing the snap fastener member to the panel by inserting the U-shaped attaching portion into the aperture by direct axial movement and thereafter moving the snap fastener member laterally so that the U-shaped attaching portion engages opposite sides of the apertured panel.

2. In an installation of the class described, the method of securing a snap fastener member having a U-shaped attaching portion to a panel having one side covered by upholstery which comprises forming an aperture in said panel of a size at least as large in area as the area of one of the arms of the U-shaped attaching portion, covering one side of the panel with the upholstery thereby to conceal the aperture therein when the panel is viewed from one side and securing the snap fastener member to the panel by inserting the U-shaped attaching portion into the aperture by direct axial movement and thereafter moving the snap fastener member laterally so that the U-shaped attaching portion engages opposite sides of the apertured panel.

3. In an installation of the class described, the method of securing a snap fastener member having a U-shaped attaching portion to a panel having one side covered by upholstery which comprises forming an oblong aperture in said panel of a size at least as large in area as the area of one of the arms of the U-shaped attaching portion and securing the snap fastener member to the panel by inserting the U-shaped attaching portion into the aperture by direct axial movement and thereafter moving the snap fastener member laterally toward the nearest edge of the panel so that the U-shaped attaching portion engages opposite sides of the apertured panel.

In testimony whereof, I have signed my name to this specification.

ALFRED J. SMITH.